March 26, 1940. H. A. HUTCHINS 2,194,945
CONTROL MECHANISM FOR EARTH WORKING DEVICES
Filed April 14, 1937  3 Sheets-Sheet 1
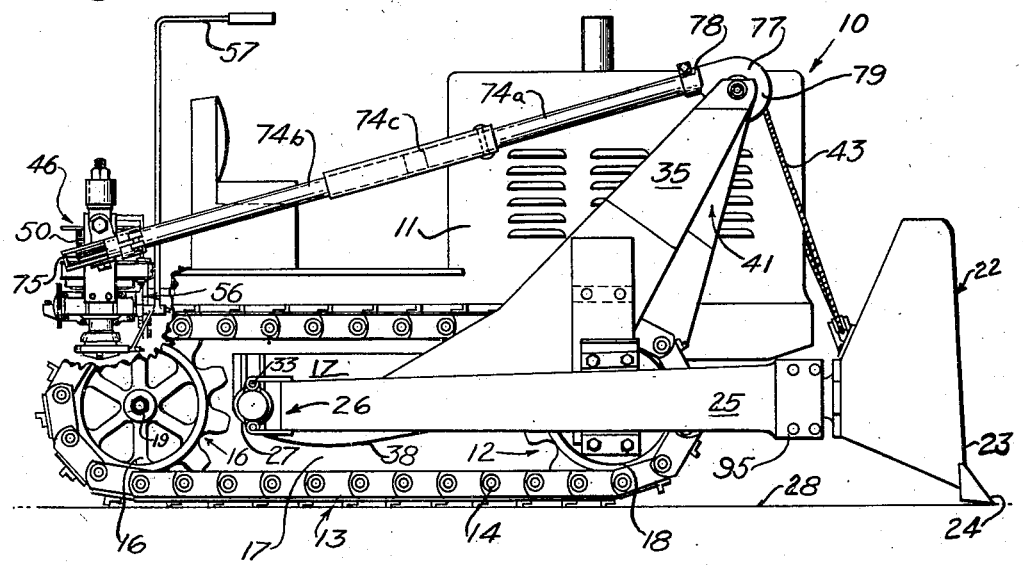
Hugh Allen Hutchins,
INVENTOR
BY
ATTORNEY

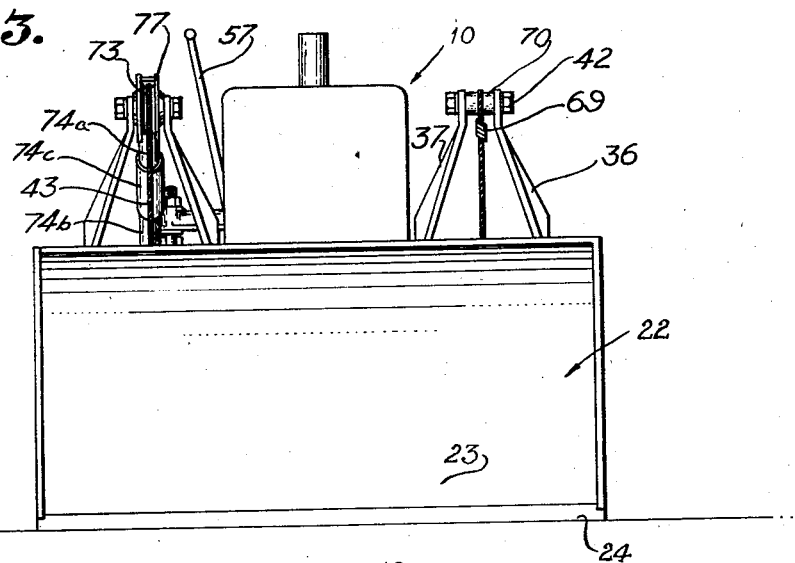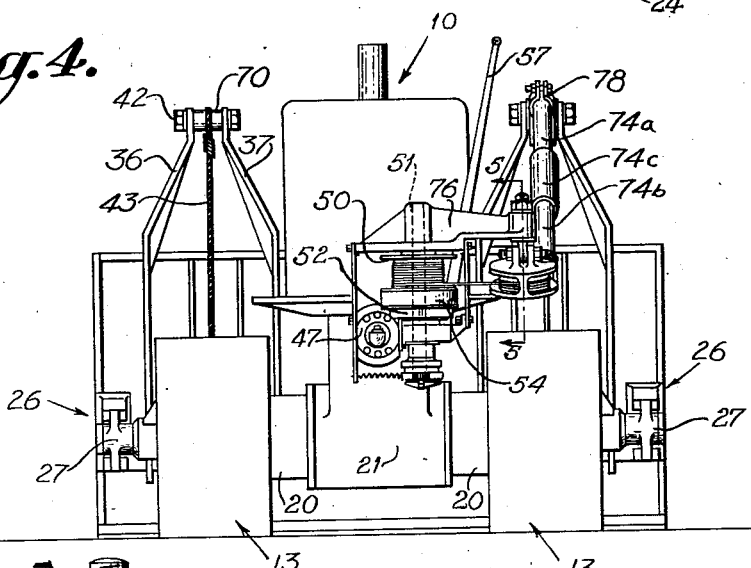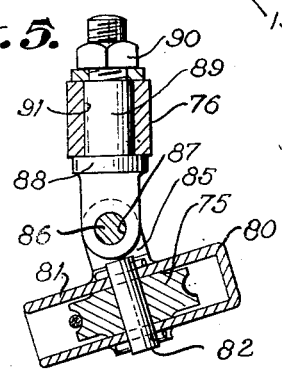

March 26, 1940.  H. A. HUTCHINS  2,194,945
CONTROL MECHANISM FOR EARTH WORKING DEVICES
Filed April 14, 1937  3 Sheets-Sheet 3

HUGH ALLEN HUTCHINS,
INVENTOR
BY
ATTORNEY

Patented Mar. 26, 1940

2,194,945

UNITED STATES PATENT OFFICE 2,194,945

CONTROL MECHANISM FOR EARTH
WORKING DEVICES

Hugh Allen Hutchins, Glendale, Calif., assignor
to Emsco Derrick & Equipment Company, Los
Angeles, Calif., a corporation of California Application April 14, 1937, Serial No. 136,851

10 Claims. (Cl. 37—144)

My invention relates in general to ground working implements of the power driven type having ground working or ground engaging tool means movably supported thereon so as to be adjusted to different positions or conditions of operation, and relates in particular to a controllable, power operated means for moving the tool means as may be desired or required in the operation thereof.

My invention is of especial utility with those types of devices, such for example as bulldozers, trail builders, etc., wherein tools or blades are mounted upon a tractor so as to be moved through their various positions. It is an object of the present invention to provide a simple, reliable and readily controlled means whereby a tool or tools may be moved or adjusted on a supporting vehicle in accordance with the requirements of the work being done by the devices.

In ground working devices of the general type to which my invention relates a track-laying tractor is employed and the desired tool equipment is supported in projecting relation thereto. Owing to the fact that the forward portions of the tractor tread supports are independently movable in vertical direction so as to have compensation for unevenness of the ground over which the tractor is driven, more or less difficulty has been encountered in the provision of suitable supporting means for the tool equipment which is ordinarily very heavy and is subjected to great strain during the operation of the device. It is an object of the present invention to provide a novel means for movably supporting the tool equipment of a ground or road working device of the above character wherein the loads and forces incidental to the use of heavy tool or blade members will be applied in a manner to avoid the possibility of breaking or otherwise injuring the tractor structure.

It is a further object of my invention to provide an earth working device in which the tool means is supported on the tread elements or track frame while the control mechanism therefor is mounted on the body of the tractor, and in which the tool means and control mechanism are associated together in such a manner that strains produced by vertical movement of the tread elements are not transmitted to the control mechanism.

It is a still further object of my invention to provide an earth working device of the character pointed out heretofore in which a cable means is employed for moving the tool means into various positions, and in which the sheaves are maintained in alignment upon movement of the parts when either of the tread elements move vertically.

It is a still further object of my invention to provide an earth working device of the character pointed out heretofore in which a cable is used to raise and lower the tool means, which cable passes over a sheave mounted on one of the tread elements and also over a sheave mounted on the body of the tractor, and in which means is provided for aligning the last mentioned sheave with the first mentioned sheave whenever the first mentioned sheave is moved vertically with the tread elements.

Further objects and advantages of the invention will be brought out in the following part of the specification.

Referring to the drawings which are for illustrative purposes only,

Fig. 1 is an elevational view showing a simple form of the invention, a portion of the structure being broken away to show an elevation of the power take-off.

Fig. 2 is a plan view corresponding to Fig. 1, a portion thereof being also broken away to disclose parts of the power take-off.

Fig. 3 is a front end view of the device.

Fig. 4 is a rear end view of the device.

Fig. 5 is an enlarged fragmentary section taken as indicated by the line 5—5 of Fig. 4.

Figure 6:
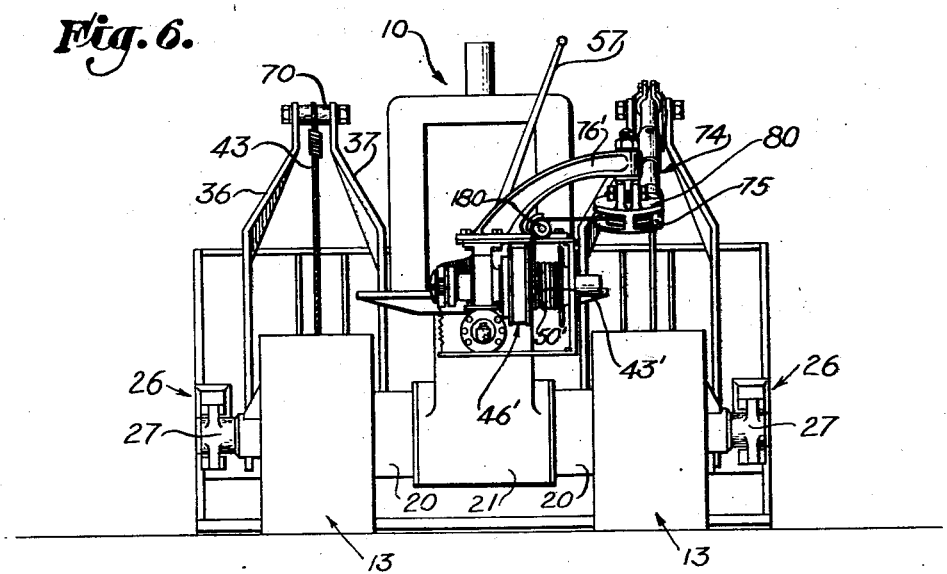
Fig. 6 is a rear elevation showing a form of my invention in which a horizontal cable drum is used instead of the vertical drum shown in Fig. 4.

In Figs. 1 to 4 of the drawings I have shown a tractor 10 having a body or superstructure 11 which is movably supported by an undercarriage 12 which includes a pair of tread elements 13 lying on opposite sides of and below the plane of the superstructure 11 and each consisting of a tread chain 14 and a supporting means, each of which includes a drive sprocket 16, as best shown in Fig. 1, longitudinal bar or spreader members 17 or track frames which extend forwardly from the sprockets 16 in positions within the loops of the tread chains 14 and carrying idler wheels 18 at the forward ends thereof over which the forward portions of the tread chains 14 run. The drive sprockets 16 are mounted on axle shafts 19, as indicated in Fig. 1, each axle shaft 19 projecting laterally from an end of a rear axle housing 20, there being two of such rear axle housings, disposed in positions to project oppositely from a transmission casing 21 located at the rearward end of the body 11 of the tractor.

The ground engaging tool means employed in the form of the invention which I have chosen for the purpose of illustrating my invention consists of a pusher member 22 having a blade or plate member 23 with a knife 24 at the lower edge thereof. This ground engaging tool, or pusher member 22 has a pair of arms or thrust bars 25 extending rearwardly from the ends thereof and along the sides of the tread elements 13, and having their rearward or leftward ends 26 pivotally connected to the rearward portions of the tread elements 13 by means of mounting blocks or brackets 27 which are secured to the rearward portions of the outer side bars 17 of the tread elements 13, or, these mounting blocks 27 may be integrally formed as parts of the longitudinal bar members 17.

The bulldozer structure represented by the pusher member 22 may be raised or lowered relative to the ground or road surface 28, Fig. 1, by swinging the arms 25 on the pivot members formed by the brackets or blocks 27. To provide the desired pivotal connection, each member 27 is equipped with an extending trunnion 29 on which a sleeve 30 is turnably mounted. As shown in Fig. 2, each of the sleeves 30 has a pair of vertically and oppositely extended lugs 31 to which plates 32 at the rearward ends of the arms 25 are connected by means of pins 33. It will be seen that with this construction all thrust imparted to the pusher member 22 as the result of the operation of the bulldozer will be transmitted to the tread elements 13.

The weight of the pusher member 22 and the forward portions of the arms 25 is also carried directly by the tread elements 13 by the use of a boom member 35 which is preferably employed in duplicate, one on each of the tread elements 13. Each of these boom members 35 is connected solely to the cooperating tread element 13 and therefore without direct connection to the tractor body 11. Each boom member 35 comprises an outer plate 36 and an inner plate 37, the outer plates 36 extending along the outer faces of the tread elements 13 and being connected to the outer longitudinal bar or spreader members 17, and the inner plate members 37 extending along the inner faces of the tread elements 13 and being connected likewise to the inner bar members 17 of the tread elements 13. The rearward ends 38 of the outer plate members 36 are connected preferably to the mounting blocks 27. The inner plate members 37 are connected to the inner faces of the tread elements 13 in a similar manner. The forward ends 41 of the plate members 36 and 37 of the boom members 35 are extended forwardly and upwardly as clearly shown in Figs. 1 and 2, and the extremities thereof are converged toward each other and are connected by means of bolts 42. Lifting means or suspension means, shown in the form of a cable 43, is connected between the member 22 and the boom members 35 so that the weight or load of the tool represented by the member 22 will be received by the boom members 35 and transmitted thereby directly to the tread elements 13.

For actuation of the cable 43, I provide the means to be hereinafter described. As shown in Fig. 2, the power drive equipment of the tractor includes a driven shaft member 44 disposed within a flanged casing 45 at the upper rearward part of the transmission housing 21. The shaft member 44 is in constant rotation as long as the engine of the tractor is in operation. In a manner to be driven by the shaft 44, I provide a controllable power take-off 46 which includes a casing member adapted to be secured to a flange 53 at the outer end of the casing 45. The power take-off follows in general the construction disclosed in my co-pending application Serial No. 64,090, filed February 15, 1936, for Power take-off for power driven vehicle and is employed in this invention in accordance with the disclosure in my co-pending application entitled Power control for earth working devices, Serial No. 136,850, filed April 14, 1937. For details of construction and operation reference should be had to my co-pending applications.

The power take-off includes a spool 50 rotatably mounted on a shaft 51, which shaft 51 is rotated through mechanism contained within the power take-off, as is explained fully in my co-pending application referred to above. The spool 50 may be connected so as to be rotated with the shaft 51 by the operation of a clutch 52. Also the spool 50 may be locked from operation by operation of the brake 54. The clutch 52 and brake 54 are operated by operating mechanism generally indicated by the numeral 56 which is in turn operated by the hand lever 57. This hand lever 57, as will be seen, extends upwardly to one side of the operator's chair where it may be conveniently manipulated. The lever 57 is manipulated, as explained in my co-pending application, in order to operate a clutch and brake as explained therein. In view of the fact that this mechanism is identical to that disclosed in my co-pending application, reference may be had thereto for its mode of operation, and it is therefore not necessary to repeat the same in this specification.

As best shown in Fig. 2, the front end 69 of the cable 43 is connected to a sleeve 70 mounted on the bolt 42 at the upper end of the leftward boom member 35. From the sleeve 70, the cable 43 is carried downwardly and over a sheave 71, mounted on the back of the pusher member 22, to a second sheave 72 which is also mounted on the back of the pusher member 22. From the sheave 72, the cable 43 is extended to a sheave 73 supported on the bolt 42 which is disposed at the upper end of the right hand boom member 35. The cable 43 passes over the sheave 73 and through a tube 74 to a sheave 75 which is adjustably mounted on a rigid arm 76 which may be connected to the power take-off and which extends laterally to one side of the power take-off 46. The arm 76 may form an integral part of the frame 76a which is bolted to the tractor body. The cable 43 extends laterally from the sheave 75 to the spool 50 on which the remaining portion is wound.

The forward end of the tube or spreader member 74 is connected by means of a sheave supporting member 77 to the bolt 42 which supports the sheave 73, this member 77 comprising a split sleeve 78, adapted to be clamped on the forward end of the tube 74, and a pair of plates 79 of circular form which extend forwardly from the split sleeve 78 on opposite sides of the sheave 73 and pivot on the bolt 42 which supports the sheave 73. The rearward sheave 75 is carried in a similar sheave supporting member 80 comprising a pair of plates 81, as shown in Fig. 5, between which plates the sheave 75 is supported on a pin 82, and a split clamping sleeve 83 is adapted to receive the rearward end of the tube 74. From the upper plate 81 of the member 80, a pair of lugs 85 project upwardly on opposite sides of the pin 82. These lugs 85 support a hinge pin 66 which passes through an opening 87 in the lower part of a vertical post 88 which has a pin portion 89 forming its upper end and being threaded to receive a nut 90. The vertical pin portion 89 is turnable in an opening 91 formed in the outer end of an arm 76 which is rigidly connected to the power take-off 46. The members 86 and 88, with their associated parts, provide a universal connection for attaching the sheave supporting means 80 and the rearward end of the tube 74 to the outer end of the arm 76.

In the form of my invention disclosed herein the tube 74 is made in two parts, 74a and 74b, the part 74a being connected to the member 77, and the part 74b being connected to the member 80. These two parts are telescopically connected together by means of a sleeve 74c which is connected to the rearward end of the part 74a and which surrounds the forward end of the part 74b. It will be seen that this sleeve 74c holds the parts 74a and 74b in absolute alignment and furthermore permits their relative movement, which in turn allows the member 74 to be lengthened or shortened, depending upon the position of the sheave 73. In the operation of the device the vertical movement of the associated tread element will move the boom member 35 and the sheave 75 vertically around the center of rotation of the axle 19 which either moves the sheave rearward and upward or downward and forward. It will be seen, therefore, that the telescopic joint in the tube 74 permits this movement without transmitting any abnormal strains to the arm 76 and parts rigidly associated with the body of the tractor. It will furthermore be seen that the tube 74, being connected to the member 80, causes the rearward sheave means 75 to at all times be aligned with the forward sheave means 73.

In the operation of the device, the loop of the cable 43 extending from the sleeve 70 and across the sheaves 71 and 72 to the sheave 73 is shortened or lengthened to accomplish the raising or lowering of the tool means represented by the pusher member 22. In the form of the invention shown, the pusher member 22 is rigidly secured to the forward ends of the arms 25 by means of joints 95 which permit vertical adjustment of the ends of the pusher member 22 so that the knife 24 will be disposed at a desired level. The cable 43, as will be seen, extends from the rearward sheave 75 and is wound on the spool 50. By operating the spool 50, the cable may be wound or unwound relative thereto, with the result that the bulldozer will be raised or lowered. By proper operation of the brake 54, the spool may be locked in a desired position, and likewise the bulldozer will be secured in a given position. In the operation of the device over ground which is not level or has bumps therein, the rightward tread element 13 may be raised or lowered relative to the body 11 of the tractor. When this occurs, the bolt 42 which supports the sheave 73 swings on an arc around the axis of the shaft member 19, Fig. 1, and the member 77 which encloses the sheave 73 may turn on the aforementioned bolt 42. As the tube 74 is swung vertically and the forward section 74a displaced forwardly and rearwardly there will be a turning of the sheave supporting means 80 on the universal joint means comprising the parts 86 and 88 so that the differences in positions are compensated for without placing any abnormal strains on any parts.

I have shown the invention in use with a type of device known as a bulldozer wherein the pusher or scraper member 22 is mounted in a fixed horizontal relation; that is, the pusher member 22 is fixed to the forward ends of the arms 25 so that both ends of the pusher member 22 will move vertically simultaneously. It is contemplated that the features of the invention may be likewise used in conjunction with other types of ground or road working devices, such for example as trail builders wherein the ends of the pusher or scraper member 22 are raised and lowered independently so that the knife 24 will be carried along at an angle to the surface along which the tractor is moving. In this type of construction, the power take-off is used in duplicate so as to provide two spools from which two separate cables are extended along opposite sides of the tractor and over separate sheaves at the forward ends of the boom members 35 to the ends of the pusher or scraper member 22 which will be then connected to the forward ends of the arms 25 by joints 95 which are flexible instead of rigid. Then, by separate actuation of the cables the ends of the pusher or scraper member may be independently raised and lowered as required in the operation of the device.

I have also shown the preferred form of the invention wherein the drum or spool 50 is mounted so as to rotate on a vertical axis so that the cable may pass directly from the spool to the sheave 75, as shown in Figs. 2 and 4, without intervening guide pulleys. This feature is independent of the other valuable features of the invention which accordingly may be used with a power take-off device having a horizontally disposed cable spool. To illustrate this I have in Fig. 6 shown the tractor 10 equipped with the boom members 35 on the respective tread elements 13, and the pusher or scraper member 22. In the device shown in Fig. 6, the power take-off 46' is turned on its side so that its spool 50' will rotate on a horizontal axis. The arm 76', which corresponds to the arm 76 of Fig. 4, is rigidly secured to or formed integral with the frame and is positioned above the power take-off 46'. From the spool 50' the cable 43' is carried vertically to a pulley 180 and is carried over this pulley 180 to a sheave 75 secured by universal joint means to the rightward end of the arm 76', this sheave 75 being mounted in the manner previously described in a sheave supporting means 80 disposed at the rearward end of a cable guide tube 74.

In the foregoing description and drawings I have illustrated a form which at the present time constitutes the preferred form of my invention. Various alterations and modifications may be made without departing from the spirit and scope of my invention. I therefore do not wish my invention to be limited to the details of construction disclosed herein but wish it to be broadly construed to cover the principle or mode of operation thereof in accordance with the spirit and scope of the appended claims.

I claim as my invention:

1. In a device of the character described, the combination of: a vehicle having a body structure and an undercarriage structure having ground engaging elements at the sides thereof which are movable relative to said body structure; tool means supported at an end of said vehicle so as to be moved upwardly and downwardly to and from operative position; a sheave member mounted on one of said ground engaging elements near to said tool means and so as to move with said ground engaging element as the same moves relative to said body structure of said vehicle; a cable connected to said tool means and running over said sheave member; a cable actuating member mounted on said vehicle; a second sheave member; means to adjustably mount said second sheave member on said body structure in operative position relative to said cable actuating member so that forces transmitted from said cable to said second sheave member will be transmitted by said mounting means to said body structure, said cable running from said first sheave member over said second sheave member to said cable actuating member; and means connecting said sheave members together so that said second sheave member will align with said first sheave member in response to movement of said first named sheave member.

2. In a device of the character described, the combination of: a vehicle having a body structure and an undercarriage structure with ground engaging elements at the sides thereof which are movable relative to said body structure; tool means supported at an end of said vehicle so as to be moved upwardly and downwardly relative to the ground; a sheave member mounted on one of said ground engaging elements near to said tool means and so as to move therewith as the same moves relative to said body structure; a cable connected to said tool means and running over said sheave member; a cable actuating member mounted on said vehicle; a second sheave member adjustably mounted on said body structure in operative position relative to said cable actuating member, said cable running from said first sheave member to said cable actuating member; and telescopic cable guide means guiding said cable from one of said sheaves to the other and connecting said sheave members together so that said second sheave member will move in response to movement of said first named sheave member.

3. In a device of the character described, the combination of: a vehicle having a body structure and an undercarriage structure with ground engaging elements at the sides thereof which are movable relative to said body structure; tool means mounted on said vehicle so as to be moved up and down relative to the ground; a sheave member mounted on one of said ground engaging elements in operative relation to said tool means and so as to move with said ground engaging element as the same moves relative to said body structure of said vehicle; a cable connected to said tool means and running over said sheave member; a cable actuating member mounted on said vehicle; a second sheave member mounted in operative relation to said cable actuating member, said cable member running from said first named sheave member over said second sheave member to said cable actuating member; an arm mounted on said body structure, the end of said arm being connected to said second named sheave member and said arm transmitting to said body structure the forces imparted to said second named sheave member by said cable; and means connecting said sheave members together so that said second named sheave member will align with said first named sheave member in response to movement of said first named sheave member.

4. In a device of the character described, the combination of: a tractor having a body structure and tread elements movably connected thereto; tool means supported for operative movement at the forward end of said tractor; a boom member mounted on one of said tread elements so as to move therewith as said tread element moves relative to said body structure; a cable guide carried by said boom member near said tool means; cable actuating means on said tractor; a second cable guide disposed on said body structure in operative relation to said actuating means; a cable extending from said tool means and over said guides to said actuating means; and telescopic means connecting said cable guides together.

5. In a device of the character described, the combination of: a tractor having a body structure and tread elements movably connected thereto; tool means supported for operative movement at the forward end of said tractor; a boom member mounted on one of said tread elements so as to move therewith as said tread element moves relative to said body structure; a cable guide carried by said boom member near said tool means; cable actuating means on said tractor; a second cable guide disposed in operative relation to said actuating means; a cable extending from said tool means and over said guides to said actuating means; an arm mounted on said body structure, the end of said arm being connected to said second guide so as to support the same; and means disposed in a plane above said tread elements for connecting said second guide to said first guide so that one guide may move toward and away from the other as said boom member moves relative to the body structure of the tractor.

6. A device as defined in claim 5 in which said means connecting said guides together comprises a telescoping tube through which said cable passes.

7. In a device of the character described, the combination of: a tractor having a body structure and tread elements movably connected thereto; tool means supported for operative movement at the forward end of said tractor; a boom member mounted on one of said tread elements so as to move therewith; forward sheave means mounted on said boom member; a telescoping tubular member extending rearwardly from said forward sheave means; rearward sheave means connected to the rearward end of said tubular member; means mounted directly upon said body structure for supporting the rearward end of said tubular member; cable actuating means mounted on said tractor adjacent said rearward sheave means; and a cable extending from said tool means, over said sheave means, and through said tubular member to said cable actuating means.

8. In a device of the character described, the combination of: a tractor including movable tread elements; tool means supported for operative movement at the forward end of said tractor; a boom member mounted on one of said tread elements so as to move therewith; forward sheave means mounted on said boom member; cable actuating means connected to the rearward part of said tractor; a rearward sheave means adjustably supported by said tractor in a fixed position relative to said body structure; a cable extending from said cable actuating means to said rearward sheave means, said forward sheave means, and to said tool means; and aligning means adjustable in length and connected to said forward sheave means and said rearward sheave means for aligning said rearward sheave means with said forward sheave means.

9. In a device of the character described, the combination of: a tractor having a body structure and tread elements movably connected thereto; tool means supported for operative movement at the forward end of said tractor; a sheave supported on one of said tread elements; cable actuating means mounted on said tractor; a cable extending from said tool means and over said sheave, the rearward end of said cable being connected to said cable actuating means; a second sheave; supporting means mounting said second sheave on said body structure of said tractor so as to transmit to said body structure the forces which are imparted to said second sheave by said cable and so that said second sheave will be positioned to guide said cable from said first named sheave to said cable actuating means; and a cable guide having its rear end connected by a hinge to said supporting means and extending between said sheaves, said cable guide being arranged and supported so that its front end may swing vertically on said hinge and so as to permit relative movement of said sheaves as said tread element moves relative to the body structure of the tractor.

10. In an earth moving device of the character described, the combination of: a tractor having a body and tread elements movably connected thereto so as to have vertical movement relative to the body; tool means supported for operative movement at the forward end of the tractor; a cable actuating means mounted on the tractor rearwardly of said forward end thereof; a front sheave support extending upward from one of said tread elements and being connected thereto so as to have vertical movement therewith; a front sheave supported by said front sheave support; a rear sheave support rigidly connected to and projecting from said body of said tractor in a position rearward of the front end of said tractor; a rear sheave supported by said rear sheave support; a cable extending from said cable actuating means over said rear sheave to said front sheave and thence to said tool means at the forward end of said tractor; and a cable guide pivotally connected to and extending forwardly from said rear sheave support, the front end of said cable guide being swingably connected to said front sheave support so that the weight of said front end will be carried thereby and so that the front end of said cable guide will rise and fall with the vertical movement of the tread element to which said front sheave support is connected.

HUGH ALLEN HUTCHINS.